US008312628B2

(12) United States Patent
Sakuma et al.

(10) Patent No.: US 8,312,628 B2
(45) Date of Patent: Nov. 20, 2012

(54) LIQUID DISCHARGE HEAD AND METHOD FOR MANUFACTURING THE SAME

(75) Inventors: Sadayoshi Sakuma, Kawasaki (JP); Hirokazu Komuro, Yokohama (JP); Takuya Hatsui, Tokyo (JP); Yuzuru Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 12/854,780

(22) Filed: Aug. 11, 2010

(65) Prior Publication Data

US 2011/0043565 A1 Feb. 24, 2011

(30) Foreign Application Priority Data

Aug. 18, 2009 (JP) ................................ 2009-189327

(51) Int. Cl.
*B23P 17/00* (2006.01)

(52) U.S. Cl. ............ 29/890.1; 29/851; 29/843; 347/50; 347/58

(58) Field of Classification Search ................ 29/890.1, 29/843, 846, 851; 347/50, 58
See application file for complete search history.

(56) References Cited

U.S. PATENT DOCUMENTS 6,216,342 B1 * 4/2001 Hosogai et al. ................ 29/852
7,255,426 B2 8/2007 Ibe
7,364,273 B2 * 4/2008 Takahashi ...................... 347/68
7,547,094 B2 * 6/2009 Kawamura et al. ............ 347/50
7,607,228 B2 * 10/2009 Mita ........................... 29/890.1
7,810,911 B2 * 10/2010 Shim et al. ...................... 347/61
7,996,991 B2 * 8/2011 Oguri .......................... 29/890.1

* cited by examiner

*Primary Examiner* — Derris Banks
*Assistant Examiner* — Azm Parvez
(74) *Attorney, Agent, or Firm* — Canon U.S.A., Inc., IP Division

(57) ABSTRACT

A method for manufacturing a liquid discharge head includes heating the surface portion of power line that is to be in contact with a member made of resin, thereby forming, from a precious metal layer and a nickel layer, an adhesion layer made of an alloy containing precious metal and nickel as major components.

7 Claims, 4 Drawing Sheets

LIQUID DISCHARGE HEAD AND METHOD FOR MANUFACTURING THE SAME

BACKGROUND OF THE INVENTION

1. Field of the Invention

The present invention relates to a liquid discharge head and a method for manufacturing the liquid discharge head, and more particularly to an ink jet head and a method for manufacturing the ink jet head.

2. Description of the Related Art

As recording technology progresses, liquid discharge recording apparatuses, typified by ink jet recording apparatuses, are required to enhance the speed and picture quality of recording. To meet this requirement, liquid discharge heads (hereinafter also referred to as "heads") mounted in liquid discharge recording apparatuses need to include densely-formed liquid discharge ports and corresponding elements that generate energy for discharging ink. Accordingly, power line through which power is supplied to the elements is required to have a low resistance to equally and stably supply power to each element.

U.S. Pat. No. 7,255,426 discusses a head configuration in which power line is formed of chemically stable, highly corrosion-resistant, low-resistance precious metal, such as gold, by electrolytic plating, and thus has low resistance. The head includes not only the power line, through which power is supplied to elements generating energy for discharging ink, but also terminals that establish electrical connections with external units. Those terminals, like the power line, may be formed of precious metal, such as gold, by electrolytic plating. On the power line, a member made of resin, such as polyimide and polyetheramide, is provided to form the walls of a flow path communicating with discharge ports through which liquid is discharged.

However, the power line made of precious metal, which is unreactive, chemically stable metal, has poor adhesion to the resin member. Furthermore, the resin member is likely to swell due to ink or other liquid, and is also susceptible to stress caused by heating. This may cause separation between the power line and the resin member. Separation of the resin member from the power line might result in ink corrosion and electrolysis of the power line. To improve adhesion between the power line and the resin member, an adhesion layer made of metal may be provided between the power line and the resin member by electrolytic plating, for example. However, if the terminals have an adhesion layer on their surface, joining of the terminals to external terminals cannot be ensured. It is, therefore, necessary to cover the terminals with a resist or other coating to prevent formation of an adhesion layer thereon.

Moreover, the power line and the terminals formed by electrolytic plating using precious metal have very rough surfaces. Those rough surfaces make complete removal of a resist difficult, which may cause residues of the resist to be left on the surfaces of the power line and terminals. With such resist residues, it is not possible to ensure adhesion between the power line and the resin member and the joining of the terminals to external terminals. Hence, removal of the resist residues is required, resulting in complicated processing.

SUMMARY OF THE INVENTION

The present invention is directed to a highly reliable ink jet head in which adhesion between power line and a member made of resin and joining of terminals to external terminals are ensured. The present invention is also directed to a method for easily and precisely manufacturing the ink jet head without placing any load on the manufacturing process.

According to an aspect of the present invention, there is provided a method for manufacturing a liquid discharge head including: an element substrate in which an element configured to generate energy required to discharge liquid from a discharge port, power line electrically connected to the element, and a terminal electrically connected to the power line and configured to electrically connect to an external unit are provided on a substrate; and a member made of resin having a wall of a liquid flow path communicating with the discharge port. The flow path is formed by the element substrate and the member that are in contact with each other with the wall facing inwardly.

A surface layer of the power line is in contact with the member. The method includes: preparing the element substrate including materials of the power line and the terminal, the power line materials including a first precious metal layer made of precious metal on the substrate, a first nickel layer made of nickel on the first precious metal layer, and a third precious metal layer made of precious metal on the first nickel layer, the terminal including a second precious metal layer made of precious metal on the substrate, a second nickel layer made of nickel on the second precious metal layer, and a fourth precious metal layer made of precious metal on the second nickel layer; and heating the first nickel layer and the third precious metal layer of the power line materials to form the surface layer made of an alloy of precious metal and nickel.

According to an exemplary embodiment of the present invention, a highly reliable ink jet head is provided in which adhesion between power line and a member made of resin and joining of a terminal to an external terminal are ensured.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
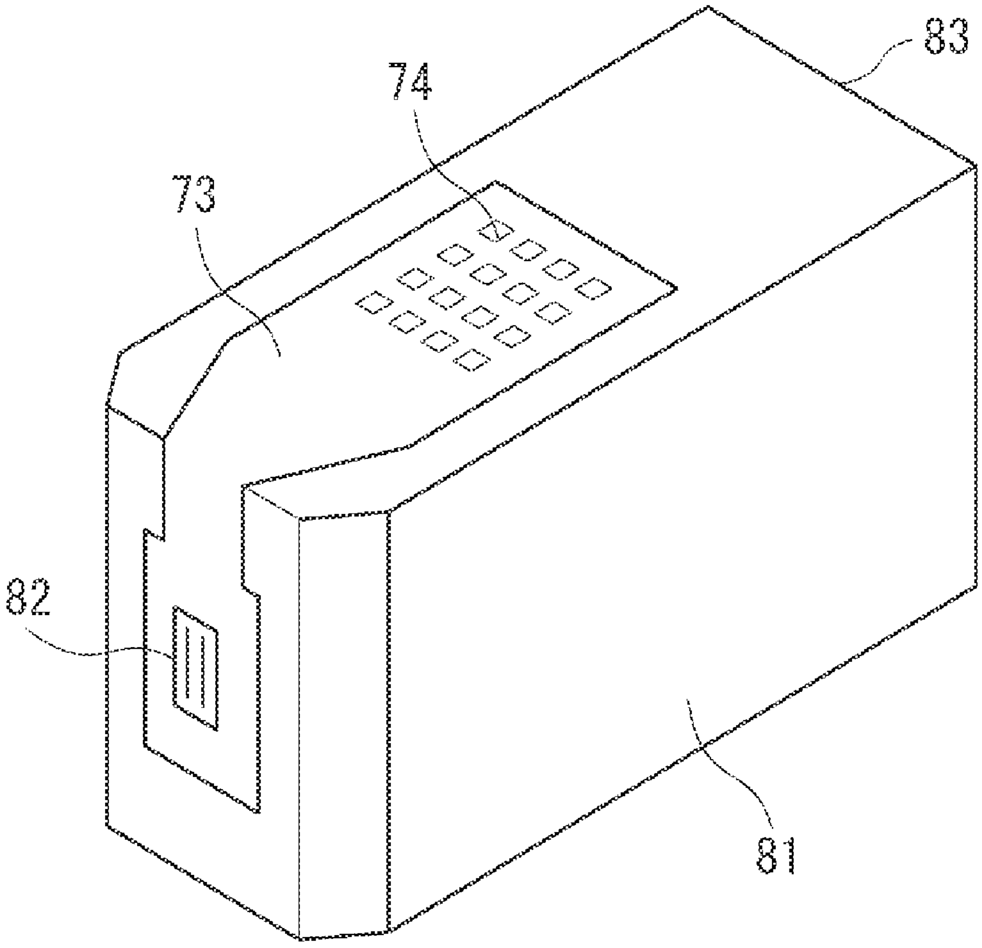
FIG. 1 is a perspective view illustrating a head unit that can include a head according to an exemplary embodiment of the invention.

FIG. 1 schematically illustrates a head unit mountable in a liquid discharge recording apparatus according to an exemplary embodiment of the present invention. The head unit includes a liquid discharge head 82 (hereinafter also referred to as a "head") that is electrically connected by a flexible printed circuit 73 to conduct electricity to and from contact pads 74. These are attached onto an ink tank 81 to form the head unit 83. The contact pads 74 are used to connect the head unit 83 with a liquid discharge recording apparatus. In the present exemplary embodiment, the head unit 83 is depicted as an example head unit in which the head and the ink tank are integrated into one unit. Alternatively, the head and the ink tank may be separate from each other.

Figure 2A:
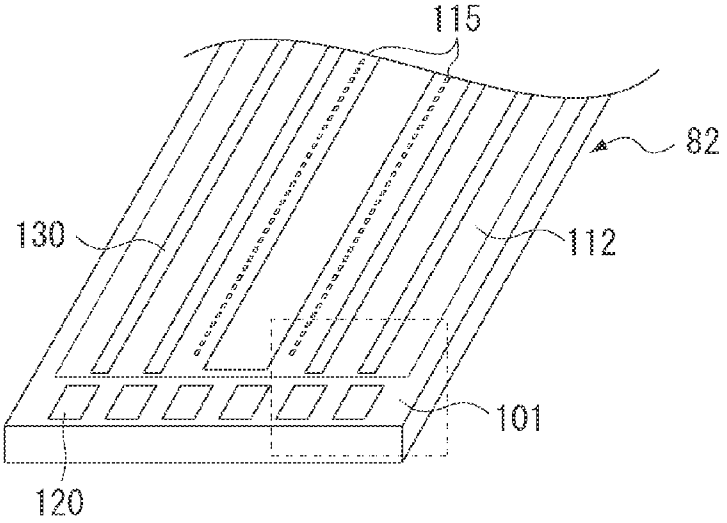
FIGS. 2A and 2B are perspective views illustrating the head according to the exemplary embodiment of the invention.
Figure 2B:
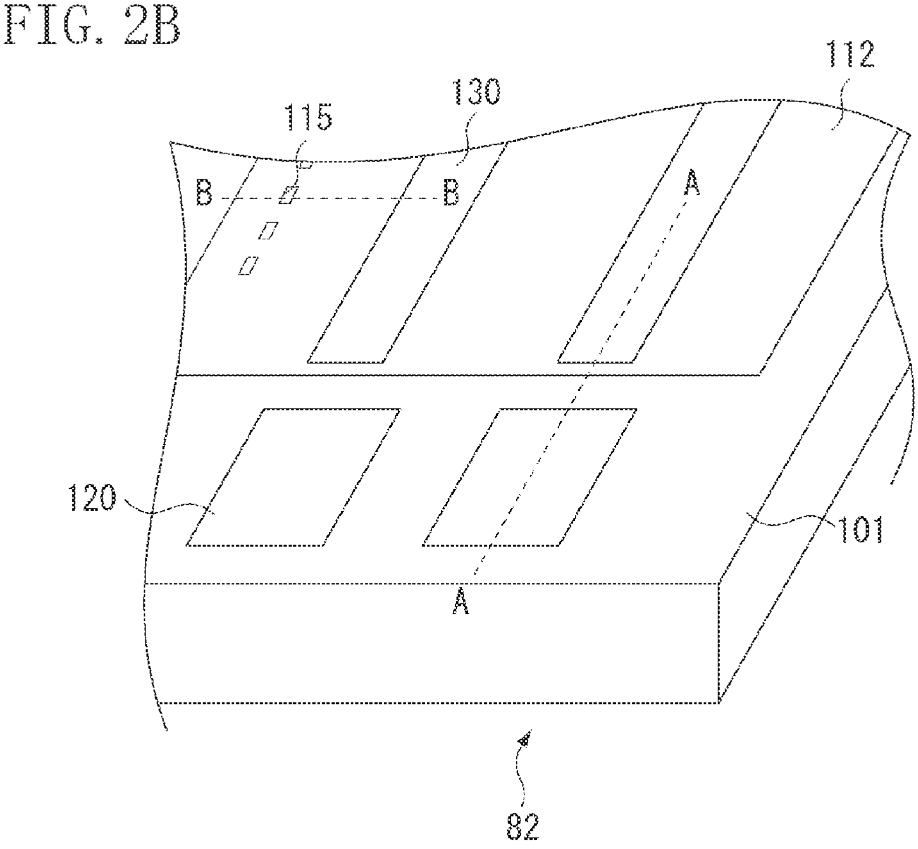

FIGS. 2A and 2B are perspective views illustrating the head 82 according to the exemplary embodiment of the invention. Discharge ports 115, heaters 113, and power line 130 are formed on a silicon substrate 101, thereby forming an element substrate. Ink is discharged through the discharge ports 115. The heaters 113 serve as elements for generating energy for discharging ink. Power for driving the heaters 113 is supplied through the power line 130.

The substrate 101 also includes electrode pads 120. The electrode pads 120 serve as terminals electrically connected to external terminals disposed, e.g., in the flexible printed circuit 73 to establish electrical connection with a recording apparatus. Some of the electrode pads 120 are electrically connected to the power line 130 to supply power for driving the heaters 113, while others are connected to a logic circuit (not shown) that inputs a signal for driving the heaters 113.

The head 82 configured as described above is capable of recording by discharging ink from the discharge ports 115 by the application of pressure generated by bubbling of the ink heated by the heaters 113.

Figure 3A:
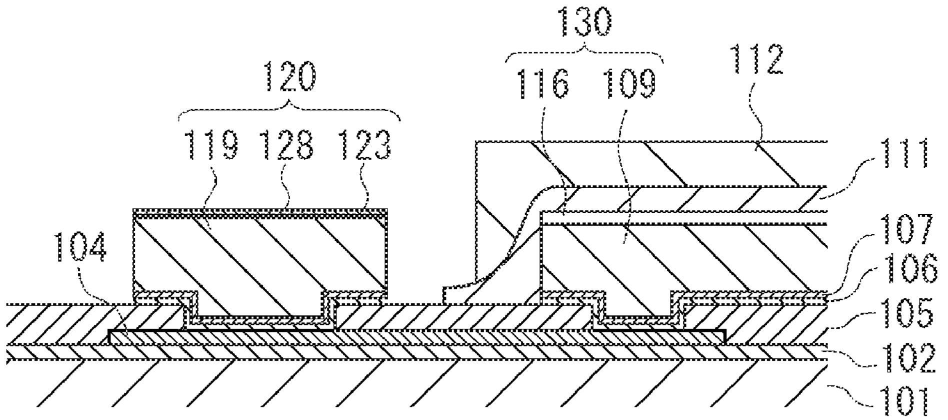
FIGS. 3A and 3B are cross-sectional views illustrating the head according to the exemplary embodiment of the invention.
Figure 3B:
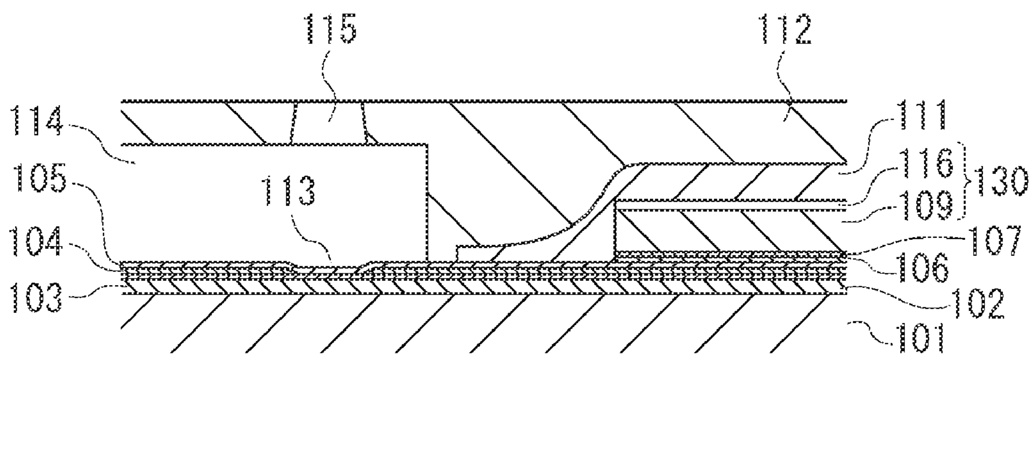

FIGS. 3A and 3B are cross-sectional views taken along lines A-A and B-B in FIG. 2B, respectively. FIG. 3A illustrates an electrode pad 120 electrically connected to the power line 130 to supply power to heaters 113. On the substrate 101 made of silicon, a thermal accumulation layer 102 made, e.g., of silicon oxide is provided, and a resistive layer 103 made, e.g., of TaSiN is formed on the thermal accumulation layer 102. On the resistive layer 103, an electrode layer 104 made of conductive material, such as Al, is provided. Part of the resistive layer 103 where the electrode layer 104 has been removed is used as a heater 113 that supplies energy for bubbling ink. On and over the heater 113 and the electrode layer 104, an insulating layer 105 made, for example, of silicon oxide or silicon nitride is provided to protect the electrode layer 104 from ink and to ensure insulation. The electrode pad 120 and the power line 130 are formed on the insulating layer 105 independently of each other. The electrode pad 120 and the power line 130 are electrically connected to the electrode layer 104 through through-holes formed in the insulating layer 105.

Formed on the power line 130 of this element substrate is a member made of resin, such as a member 112 made, e.g., of hardened epoxy resin, that forms the walls of a flow path 114 communicating with the ink discharge ports 115. The element substrate is in contact with the resin member 112 with those walls of the member 112 facing inwardly, thereby forming the flow path 114. Also, in part of the resin member 112 that is in contact with the power line 130, a protective layer 111 made, e.g., of polyetheramide resin may be provided to achieve better adhesion and to prevent corrosion of the power line 130 due to ink or other material.

The power line 130 includes a first precious metal layer 109 and an adhesion layer 116. The first precious metal layer 109 contains precious metal, such as gold, platinum, and silver, as the major component, while the adhesion layer 116 is made of an alloy whose major components are precious metal and nickel. Considering that sufficient adhesion cannot be achieved between resin and precious metal, the adhesion layer 116 is provided to ensure adhesion between the first precious metal layer 109 and the adhesion layer 116 and adhesion between the adhesion layer 116 and the member 112. The nickel content in the surface portion of the adhesion layer 116 can be 1.4 wt % or more and 80.0 wt % or less. This level of nickel content ensures adhesion more reliably. The adhesion layer 116 composed of an alloy whose major components are precious metal and nickel can be formed as follows. Precious metal is deposited as a layer on a nickel layer, and then only the part of the resultant multilayer that is to serve as the power line 130 is locally heat-treated to interdiffuse the precious metal and the nickel, thereby forming the adhesion layer 116.

On the other hand, the electrode pads 120 each include a second precious metal layer 119, a nickel layer 123, and a third precious metal layer 128 stacked in that order perpendicularly to the surface of the substrate 101. The second precious metal layer 119 contains precious metal, such as gold, as a major component. The nickel layer 123 contains nickel metal as a major component. The major component of the third precious metal layer 128 is precious metal, such as gold. The adhesion layer 116 is not formed on the electrode pads 120 to enable the third precious metal layers 128 of the electrode pads 120 to be joined to terminals that provide electrical connection with the flexible printed circuit 73. This ensures the reliable joining of the electrode pads 120 to the terminals.

A diffusion prevention layer 106 made of refractory metal material is interposed between the first and second precious metal layers 109 and 119 containing precious metal, such as gold, as a major component and the underlying electrode layer 104 made of metal, such as Al. Also, since precious metal, such as gold, is deposited by electrolytic plating, a seed layer 107, whose major component is precious metal, such as gold, is provided under the first and second precious metal layers 109 and 119. The seed layer 107, which serves as an electrode in electrolytic plating process, may be formed such that the resistance thereof is low and variation in in-plane thickness over the substrate is small, specifically, such that the thickness thereof is several hundreds Å or more. The nickel layers 110 and 123 are also deposited by electrolytic plating with the seed layer 107 used as an electrode. The layers deposited by such electrolytic plating contain only trace amounts of impurities other than the deposited material, thus enabling the formation of the plating layers having a purity of at least 95% or higher.

The following describes a method for manufacturing the head according to the exemplary embodiment of the invention.

Figure 4A:
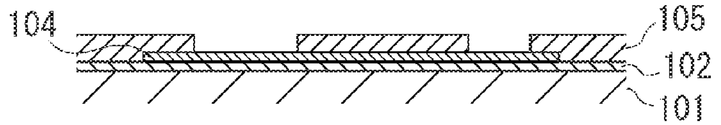
FIGS. 4A to 4F illustrate a method for manufacturing the head according to the exemplary embodiment of the invention.

A thermal accumulation layer 102 made of silicon oxide is formed on a substrate 101 made of silicon. On the thermal accumulation layer 102, a resistive layer 103 made of TaSiN is formed using a vacuum film-formation technique. Subsequently, a precious metal layer containing aluminum as a major component is formed on the resistive layer 103. The precious metal layer is then subjected to a photolithographic process, thereby forming an electrode layer 104. Parts of the resistive layer 103 where the precious metal layer thereon has been removed can thus be used as heaters 113. Then, an insulating layer 105 made of silicon nitride is formed on the electrode layer 104 and the heaters 113. Next, through-holes are formed in the insulating layer 105 using, e.g., photolithographic and dry etching techniques in a substrate preparation step as illustrated in FIG. 4A. The trough-holes thus formed allow power from power line 130 formed on the insulating layer 105 to be supplied through the aluminum electrode layer 104 to the heaters 113, which convert the power into heat for bubbling liquid.

Figure 4B:
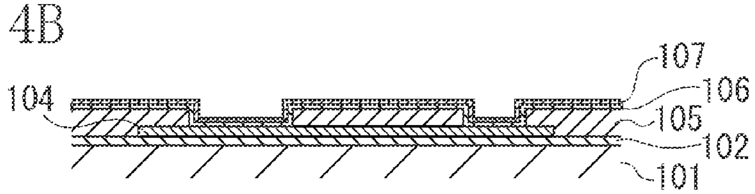

Next, titanium-tungsten, which is refractory metal material, is deposited as a diffusion prevention layer 106 to a thickness of about 200 nm, for example, by a vacuum film-formation process. On the diffusion prevention layer 106, gold is deposited as a seed layer 107 used for plating to a thickness of about 500 nm, for example, by a vacuum film-formation process, as illustrated in FIG. 4B. To increase adhesion between the diffusion prevention layer and the gold (Au) layer serving as a conductor for plating, an oxide film formed on the surface of the diffusion prevention layer 106 can be removed prior to the deposition of gold for the seed layer 107.

Figure 4C:
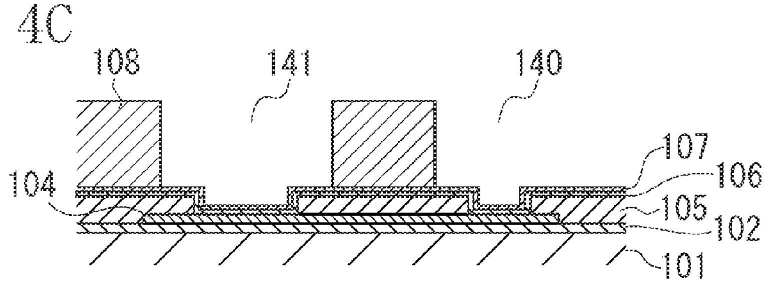

Subsequently, a photoresist is applied, by spin coating, to the surface of the gold layer serving as a conductor for plating. In this spin coating, the photoresist is applied so that the thickness thereof is sufficiently greater than that of the first precious metal layer 109 of the power line 130 and that of the second precious metal layer 119 of the electrode pads 120. In the present exemplary embodiment, since the first and second precious metal layers 109 and 119 are formed to have a thickness of 4 μm, the photoresist is applied under such conditions as to enable the photoresist thickness to be 8 μm. Next, the resist is exposed to light and developed using a photolithographic technique, thereby forming a resist mask 108 in such a manner that the seed layer 107 is exposed in each first opening 140 where the power line is to be formed and in each second opening 141 where an electrode pad is to be formed, as illustrated in FIG. 4C.

Thereafter, a current is passed through the gold of the seed layer 107 in an electrolytic bath containing, e.g., gold sulfite salt by electrolytic plating, thereby depositing first gold plating layers. Consequently, the first and second precious metal layers 109 and 119 are simultaneously formed in the first and second openings 140 and 141, respectively. The gold plating layers deposited using the electrolytic plating process contain only trace amounts of impurities other than the deposited gold, and thus have a purity of at least 95% or higher. The first gold plating layers can have a thickness of 3 μm or more and 20 μm or less. In the present exemplary embodiment, gold is deposited to a thickness of 4 μm. Since precious metals are relatively expensive, it is desired that the first gold plating layers be thin. However, with consideration given to the reliability of electrical connection and to the interconnection resistance, the thickness of the first gold plating layers is 4 μm.

Figure 4D:
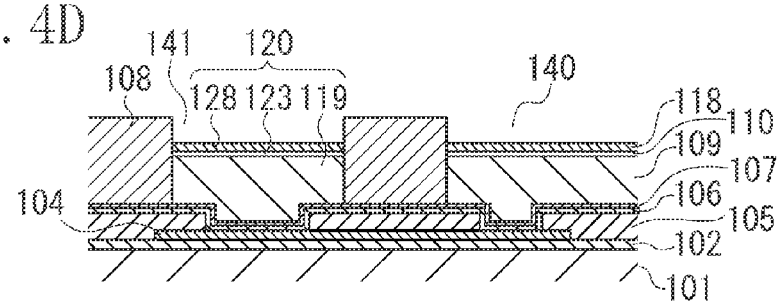

A current is then passed through the seed layer 107 in an electrolytic bath containing sulfamic acid by electrolytic plating, thereby depositing a nickel layer on the surfaces of the first and second precious metal layers 109 and 119. Consequently, first and second nickel layers 110 and 123, containing nickel as a major component, are simultaneously formed on the first and second precious metal layers 109 and 119, respectively. The nickel layers can have a thickness of 0.1 μm or more and 2 μm or less. In the present exemplary embodiment, nickel is deposited to a thickness of 1 μm. This is because nickel has a higher resistance than gold; if the thickness of the nickel layers is greater than 2 μm, the reliability of electrical connection may decrease, and if the nickel layers are thinner than 0.1 μm, a sufficient amount of nickel cannot be diffused into gold layers during heat treatment. Then, a current is passed through the gold of the seed layer 107 in an electrolytic bath containing gold sulfite salt by electrolytic plating, thereby depositing a second gold plating layer on the surfaces of the nickel layers, as illustrated in FIG. 4D. Consequently, third precious metal layers 118 and fourth precious metal layers 128, serving as different layers from the third precious metal layers 118, are simultaneously formed on the first and second nickel layers 110 and 123, respectively. The thickness of the second gold plating layers may be such that even after removal of the diffusion prevention layer 106, nickel in the underlying layer can be diffused by laser beam irradiation in a later process step, and such that for the electrode pads 120, adhesion is ensured. In the present exemplary embodiment, the second gold plating layers of 1.5 μm thickness are formed. In this manner, the power line 130 including the first precious metal layer 109, the first nickel layer 110, and the third precious metal layer 118 is formed in the first openings 140. Also, the electrode pads 120 including the second precious metal layer 119, the second nickel layer 123, and the fourth precious metal layer 128 are formed in the second openings 141.

Subsequently, the element substrate is immersed in a resist remover solution to remove the resist mask 108, thereby exposing part of the seed layer 107. Then, the element substrate is immersed in an etchant containing, e.g., a nitrogen-based organic compound, iodine, and potassium iodide to remove the outermost layer of the second gold plating layers, and gold on the surface of the part of the seed layer 107 having no gold plating layer formed thereon. This process exposes part of the diffusion prevention layer 106 made of titanium-tungsten, which is a refractory metal material. At this time, the thickness of the second gold plating layers is 1.0 μm.

Figure 4E:
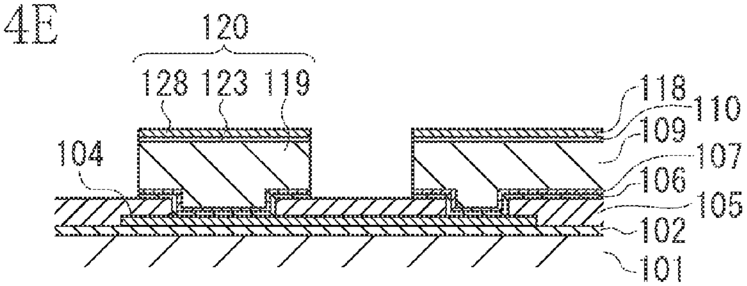

Thereafter, the element substrate is immersed in an etchant containing, e.g., hydrogen peroxide solution for a predetermined period of time to etch away the part of the diffusion prevention layer 106 having no plating layer formed thereon, as illustrated in FIG. 4E.

Then, only the power line 130 is irradiated with a laser beam 117 to heat the first nickel layer 110 and third precious metal layer 118 of the power line 130. The light source that produces the laser beam may be, for example, a He-Ne laser, a $CO_2$ laser, an excimer laser, or a Nd:YAG laser. The present exemplary embodiment employs a KrF (krypton fluoride) excimer laser operating at a wavelength of 248 nm. The first nickel layer 110 and the third precious metal layer 118 are heated to a desired temperature by adjusting, for example, the energy, wavelength, and irradiation time of the laser beam. This temperature can be not more than the melting point of gold of the third precious metal layer 118 and the melting point of nickel of the first nickel layer 110, and also be sufficient to cause thermal diffusion of gold and nickel. To be specific, the temperature can be 200° C. or more and 600° C. or less.

Irradiation with a laser beam, which has a high energy density, enables local heating to high temperature to occur instantaneously. This allows only the power line 130 to be locally heated even if the distance between the power line 130 and each electrode pad 120 is as short as 50 μm or less. Accordingly, it is possible to diffuse nickel in the power line 130 without diffusing nickel in the electrode pads 120. It should be noted that if the distance between the power line 130 and the electrode pads 120 is too short, the electrode pads 120 may also be irradiated with a laser beam intended to locally heat the power line 130. Thus, the electrode pads 120 are preferably away from the power line 130 by a distance of 10 μm or more.

Figure 4F:
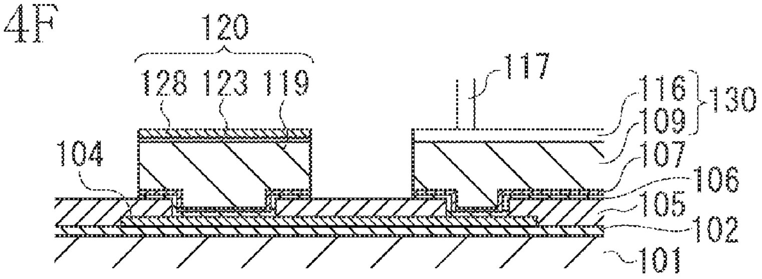

As a result of the heating, the gold of the third precious metal layer 118 and the nickel of the first nickel layer 110 in the power line 130 interdiffuse to form an adhesion layer 116 made of an alloy containing gold and nickel as major components, thereby forming an element substrate, as illustrated in FIG. 4F.

On the adhesion layer 116 thus treated, a protective layer 111 containing polyetheramide is formed to have a thickness of about 15 μm by spin coating. The presence of the protective layer 111 provides even better adhesion between the power line 130 and a member made of resin, and thus prevents corrosion of the power line 130 due to ink or other substance.

Next, a mold material corresponding to an ink flow path 114 is provided on the protective layer 111. Epoxy resin is then deposited on the mold material to a thickness of 15 μm by spin coating, and exposed to light and developed by a photolithographic technique. The mold material is then removed to form discharge ports 115, through which liquid is discharged, and a member 112 forming the ink flow path 114 communicating with the discharge ports 115, as illustrated in FIG. 3A.

The presence of the adhesion layer 116 on the power line 130 ensures adhesion between the power line 130 and the member made of resin including the member 112 and the protective layer 111. Increased adhesion to the resin member is achieved presumably because nickel is diffused into the second gold plating layers, and then the part of the nickel diffused into the surface portion is oxidized.

The nickel content in the surface layer of the power line 130 heated to about 250° C. with a laser beam was measured by electron spectroscopy for chemical analysis (ESCA). The detected nickel content was about 1.0 wt %. Furthermore, from the surface layer of the power line 130 heated to about 300° C., a nickel content of about 3% was detected.

Table 1 provides test results on adhesion between the adhesion layer 116 and the member made of resin. The presence of nickel in the surface portion of the adhesion layer 116 ensures adhesion. Particularly, when the nickel content in the surface portion is 1.4 wt % or more, adhesion is ensured more reliably. If the nickel layer is formed thick, and the power line is heated with a laser beam for a long period of time, the nickel content in the surface layer of the power line can be increased up to 80.0 wt %. Use of a laser beam allows local heating, and thus prevents the electrode pads from being heated without the need for forming a resist as a mask on the electrode pads.

TABLE 1

| | | | | | | | |
|---|---|---|---|---|---|---|---|
| Nickel Content (wt %) | 80.0 | 4.3 | 2.8 | 1.4 | 0.3 | 0.1 | 0.0 |
| Adhesion | EX | EX | EX | EX | SA | SA | PO |

In Table 1, "EX", "SA", "PO" represent excellent, satisfactory, and poor, respectively.

As described above, the adhesion layer 116 is provided as the layer adhering to the protective layer 111 of the resin member. The adhesion layer 116 is made of an alloy containing gold and nickel as major components and having a nickel content of 1.4 wt % or more and 80.0 wt % or less. The electrode pads 120 each include the fourth precious metal layer 128 made of gold as the surface layer thereof. This enables a highly reliable head to be provided in which adhesion between the member made of resin and the power line 130 and adhesion between external terminals and the electrode pads 120 for electrical connection are both ensured.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-189327 filed Aug. 18, 2009, which is hereby incorporated by reference herein in its entirety.

What is claimed is:

1. A method for manufacturing a liquid discharge head including: an element substrate in which an element configured to generate energy required to discharge liquid from a discharge port, power line electrically connected to the element, and a terminal electrically connected to the power line and configured to electrically connect to an external unit are provided on a substrate; and a member made of resin having a wall of a liquid flow path communicating with the discharge port, the flow path being formed by the element substrate and the member that are in contact with each other with the wall facing inwardly, a surface layer of the power line being in contact with the member, the method comprising:

preparing the element substrate including materials of the power line and the terminal, the power line materials including a first precious metal layer made of precious metal on the substrate, a first nickel layer made of nickel on the first precious metal layer, and a third precious metal layer made of precious metal on the first nickel layer, the terminal including a second precious metal layer made of precious metal on the substrate, a second nickel layer made of nickel on the second precious metal layer, and a fourth precious metal layer made of precious metal on the second nickel layer; and heating the first nickel layer and the third precious metal layer of the power line materials to form the surface layer made of an alloy of precious metal and nickel.

2. The method according to claim 1, further comprising:

diffusing nickel from the first nickel layer into the third precious metal layer by heating.

3. The method according to claim 1, further comprising:

making the surface layer having a nickel content of 1.4 wt % or more and 80.0 wt % or less.

4. The method according to claim 1, wherein the first and second precious metal layers are simultaneously formed by electrolytic plating, and the third and fourth precious metal layers are simultaneously formed by electrolytic plating.

5. The method according to claim 1, wherein the first, second, third, and fourth precious metal layers are made of gold.

6. The method according to claim 1, wherein the third and fourth precious metal layers are formed as different layers, and the third precious metal layer is heated by laser beam irradiation.

7. The method according to claim 1, wherein the member is made of hardened polyetheramide resin or hardened epoxy resin.

* * * * *